United States Patent [19]

Langenbeck

[11] Patent Number: 5,529,171

[45] Date of Patent: Jun. 25, 1996

[54] MODULAR FRAME ASSEMBLY FOR INDUSTRIAL CONVEYORS AND THE LIKE

[76] Inventor: Keith A. Langenbeck, 4005 University Blvd., Dallas, Tex. 75205

[21] Appl. No.: 437,092

[22] Filed: May 5, 1995

Related U.S. Application Data

[63] Continuation-in-part of Ser. No. 401,879, Mar. 10, 1995.

[51] Int. Cl.$^6$ .................................................... B65G 21/00
[52] U.S. Cl. ............................... 198/860.1; 198/860.2; 198/861.1
[58] Field of Search ........................... 198/860.1, 860.2, 198/861.1; 193/35 R

[56] References Cited

U.S. PATENT DOCUMENTS

| 3,263,951 | 8/1966 | Stokes | 198/861.1 X |
| 5,421,451 | 6/1995 | Easton | 198/860.1 |

FOREIGN PATENT DOCUMENTS

| 2446783 | 8/1980 | France | 198/860.1 |
| 0636168 | 4/1950 | United Kingdom | 198/860.1 |
| 0914856 | 1/1963 | United Kingdom | 198/860.1 |

*Primary Examiner*—James R. Bidwell
*Attorney, Agent, or Firm*—W. Kirk McCord

[57] ABSTRACT

Modular frame assemblies are made up of longitudinal beam members which may be angle or channel-shaped members having slots which intersect the flanges and legs or flanges and web portions of the longitudinal beam members. Transverse beam members extend between the longitudinal beam members and have flange portions which extend into the slots. The transverse beam members may be secured to the longitudinal beam members by conventional mechanical bolt assemblies, for example. In one embodiment, the slots in the longitudinal beam members have inwardly tapering surfaces which effect elastic deflection of the flanges of the transverse beam members to precisely locate the longitudinal beam members relative to each other and to the transverse beam members. In another embodiment, the slots in the longitudinal beam members are somewhat L-shaped and permit extension of the flange of the transverse beam member into a position to engage a flange of the longitudinal beam members, respectively, to be secured to each other by mechanical fasteners and to be located relative to the longitudinal beam members by opposed transverse surfaces on the transverse beam members. Another embodiment includes transverse channel shaped beams which have opposed distal web portions secured to the longitudinal beams and transverse edges of the channel shaped beams abut the legs or webs of the longitudinal beams.

26 Claims, 6 Drawing Sheets

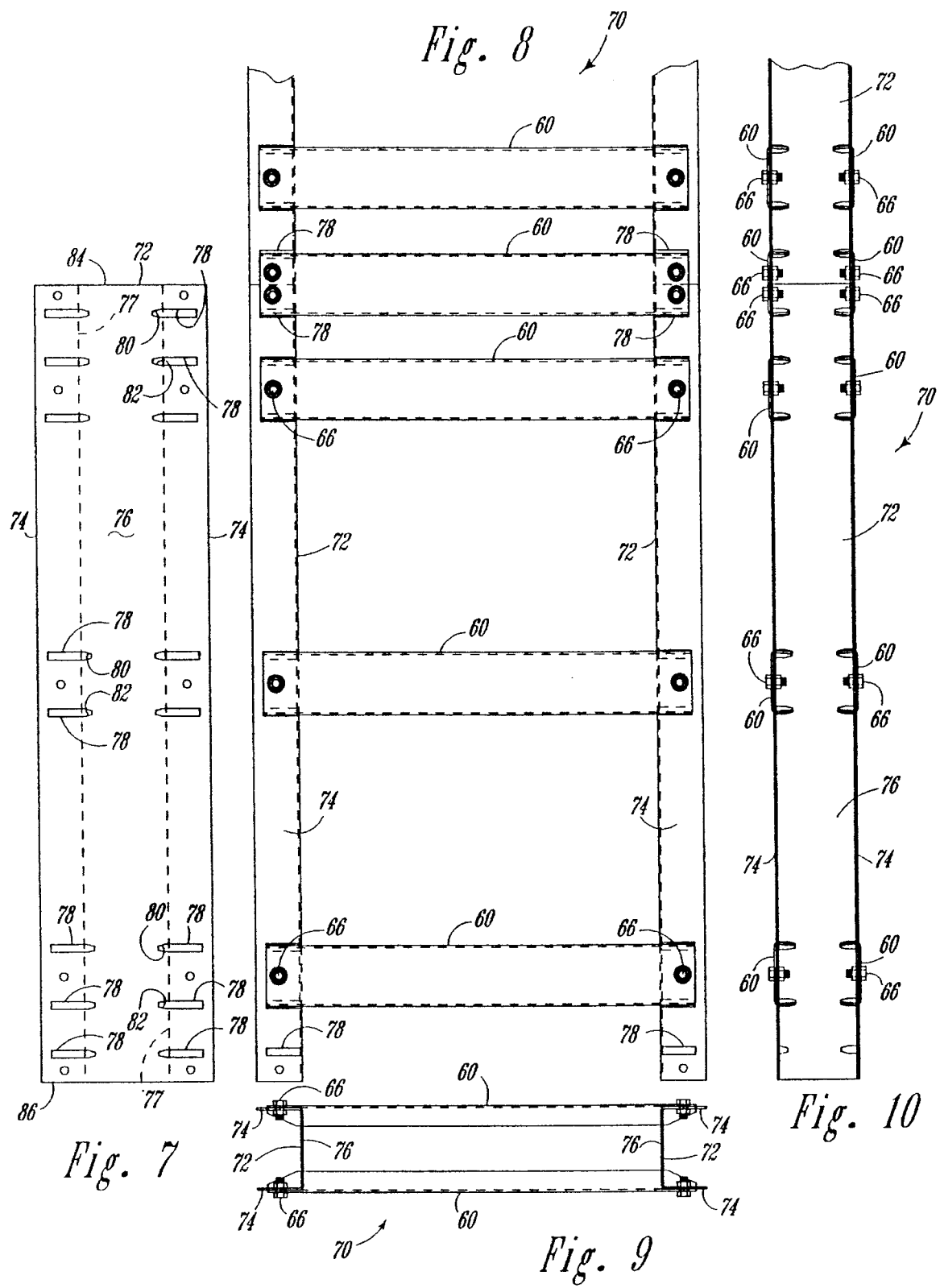

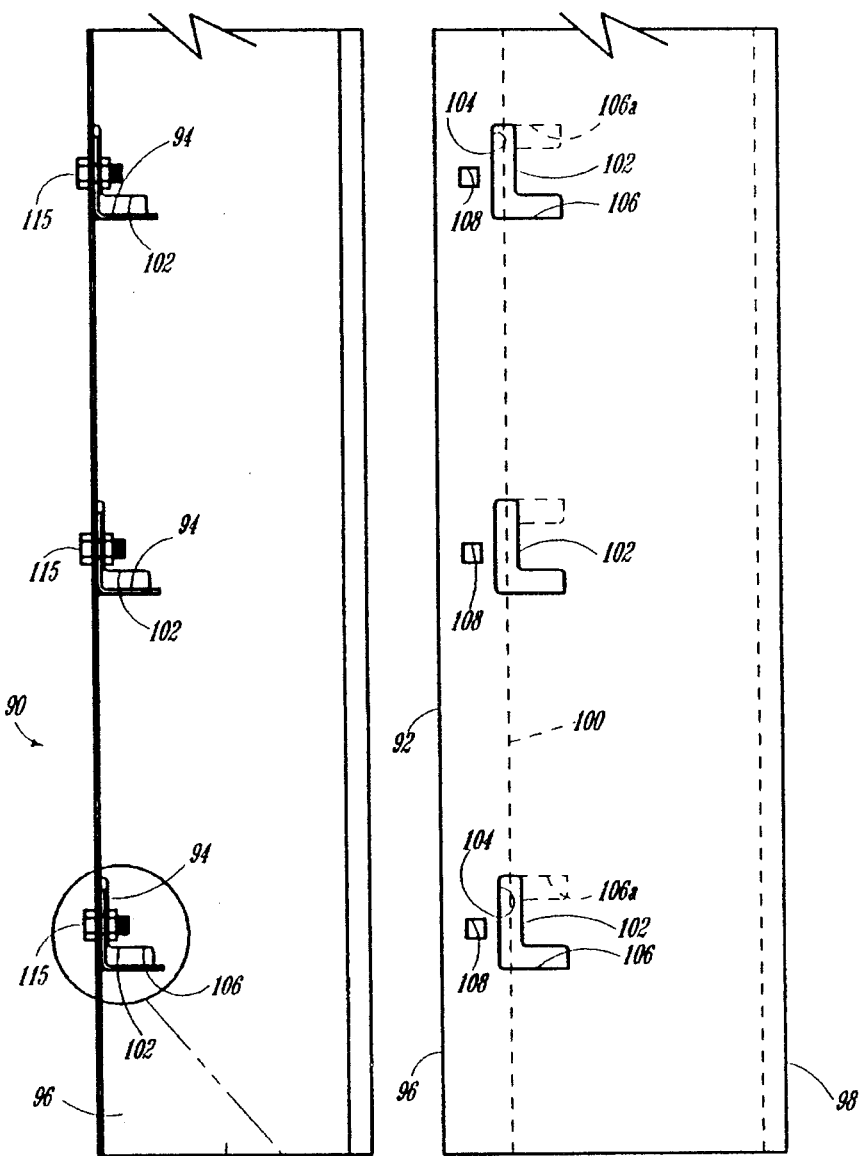
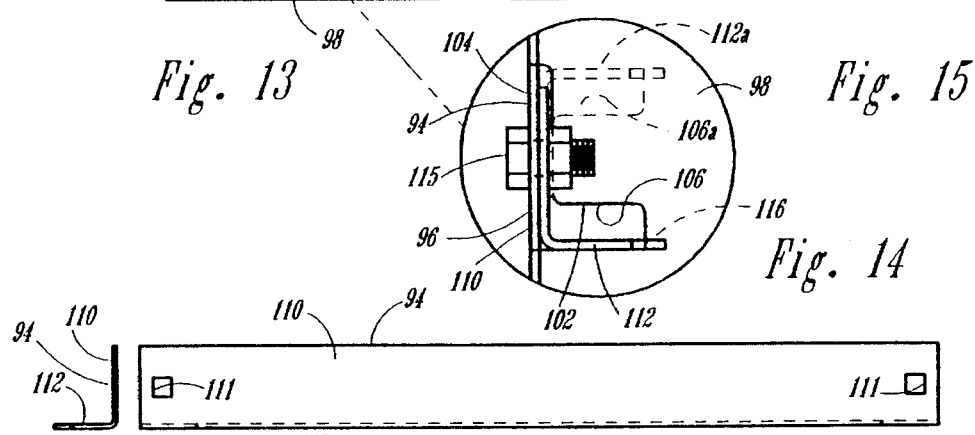
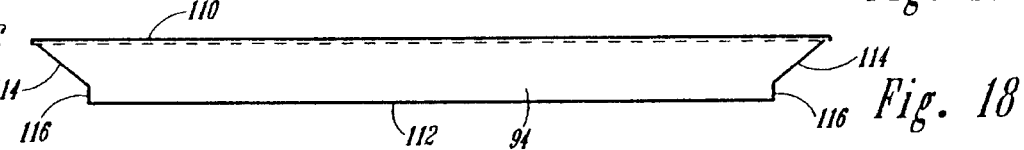

MODULAR FRAME ASSEMBLY FOR INDUSTRIAL CONVEYORS AND THE LIKE

CROSS REFERENCE TO RELATED APPLICATIONS

This application is a continuation-in-part of U.S. patent application Ser. No. 08/401,879, filed Mar. 10, 1995.

FIELD OF THE INVENTION

The present invention pertains to a modular frame assembly, particularly useful for industrial material handling conveyor systems and similar structures.

BACKGROUND

The above-referenced patent application describes and claims a unique tabletop-type conveyor system, particularly useful in the beverage and food processing industries. Material handling conveyors and similar structures must often be rearranged according to process flow changes and modifications in many industrial processes. For example, in the conveyor system described in the above-referenced patent application, it is often necessary to disassemble the conveyor to rearrange the conveyor path according to changes in the material handling capacity of the plant or facility which is utilizing the conveyor. Moreover, there are many applications for framing for various types of apparatus which desirably should be easy to assemble, have structural rigidity, be mechanically simple, and be easy to disassemble and rearrange according to various needs. The modular frame assembly of the present invention meets several of the desiderata for frames used for industrial conveyors as well as other structures as will be appreciated by those skilled in the art upon reading the following.

SUMMARY OF THE INVENTION

The present invention provides a unique frame assembly, particularly useful for constructing industrial material handling conveyors including those used in the beverage bottling industry.

In accordance with an important aspect of the present invention, a modular frame assembly is provided which includes at least two longitudinal frame members which are disposed spaced apart and are interconnected by transverse frame members by a unique connection arrangement which accurately positions the transverse frame members with respect to the longitudinal frame members, provides improved rigidity of the frame assembly, permits assembly and disassembly of the frame using conventional mechanical fasteners and may be easily fabricated using conventional engineering materials, including those which may be easily folded or bent into a desired shape.

In accordance with another important aspect of the present invention, a frame assembly is provided which includes opposed spaced apart longitudinal frame members which may be made of sheet or plate material and may be folded to form an angle or L-shaped cross section member, which member includes a plurality of spaced apart slots which receive opposed flanges of a transverse frame member in such a way that the specific location of the longitudinal frame members and transverse members is easily predetermined with respect to each other and the rigidity of the frame is enhanced. Moreover, the frame members may be easily fabricated and shipped to an assembly site, assembled with conventional mechanical fasteners and disassembled easily for transport. In certain embodiments of the invention, the trans- verse frame members are formed as elongated channel members and in other embodiments of the invention the transverse frame members are formed as L- or angle-shaped members. In yet another embodiment of the invention, both the longitudinal frame members the transverse frame members are formed as channel shaped members.

In accordance with yet a further aspect of the present invention, a unique ladder-type frame is provided characterized by spaced apart parallel longitudinal frame members and spaced apart transverse frame members which interconnect the longitudinal frame members to provide a frame which is easily constructed, is rigid and is easily disassembled and reconfigured for various applications.

Those skilled in the art will further appreciate the above-mentioned advantages and features of the invention together with other important aspects thereof upon reading the detailed description which follows in conjunction with the drawing.

BRIEF DESCRIPTION OF THE DRAWING

FIG. 7 is a developed plan view of a longitudinal beam member of a frame assembly as shown in FIG. 8;

FIG. 8 is a plan view of a first alternate embodiment of a frame assembly in accordance with the present invention;

FIG. 9 is a transverse end view of the frame assembly shown in FIG. 8;

FIG. 10 is a longitudinal side elevation of the frame assembly shown in FIG. 8;

FIG. 13 is a partial side elevation of the frame assembly shown in FIGS. 11 and 12;

FIG. 14 is a detail view on a larger scale showing a connection between one of the longitudinal beam members and one of the transverse beam members of the embodiment shown in FIGS. 11, 12 and 13;

FIG. 15 is a developed plan view of a portion of one of the longitudinal beam members of the embodiment shown in FIGS. 11, 12 and 13;

FIG. 16 is an end view of one of the transverse beam members of the embodiment shown in FIGS. 11, 12 and 13;

FIG. 17 is a plan view of the transverse beam member shown in FIG. 16;

FIG. 18 is an elevation of the transverse beam member shown in FIGS. 16 and 17;

DESCRIPTION OF THE PREFERRED EMBODIMENTS

Figure 1:
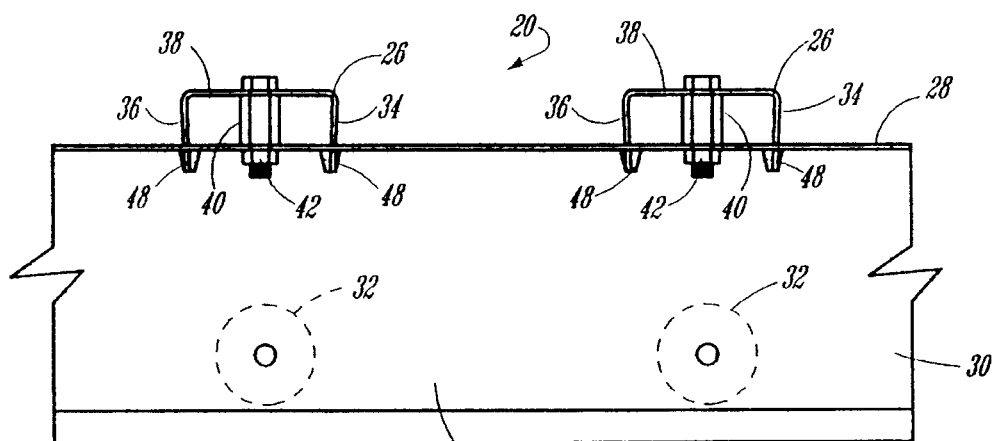
FIG. 1 is a side elevation of a portion of a frame assembly in accordance with the invention.

In the description which follows, like elements are marked throughout the specification and drawing with the same reference numerals, respectively. The drawing figures are not necessarily to scale.

Figure 2:
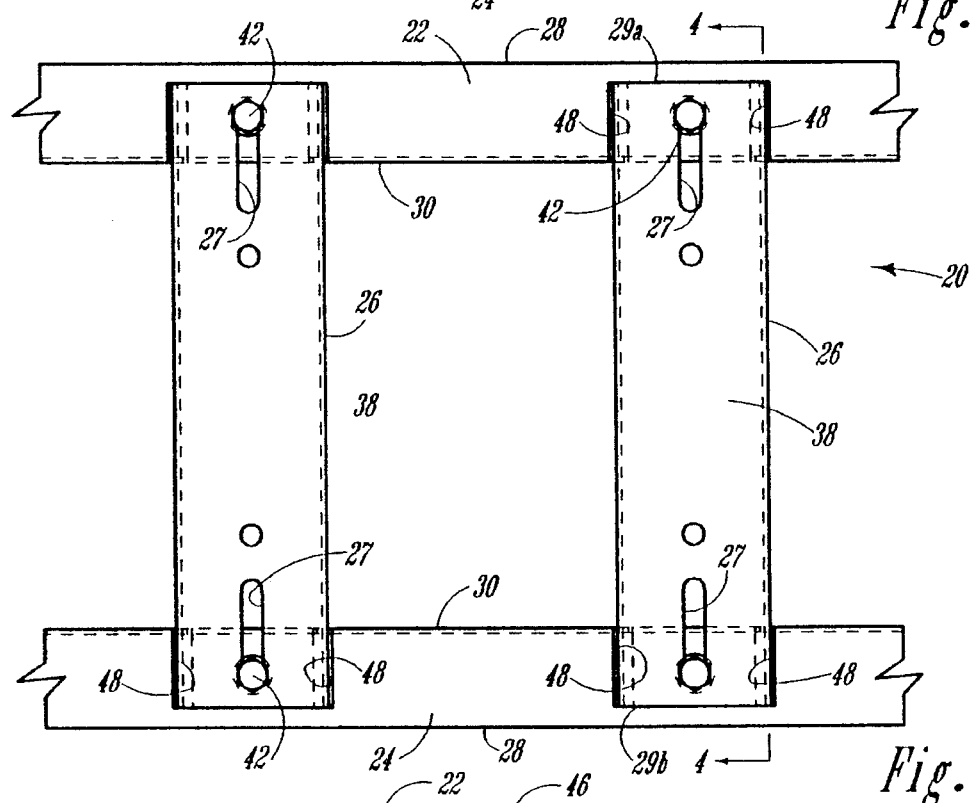
FIG. 2 is a plan view of a portion of the frame assembly shown in FIG. 1.
Figure 4:
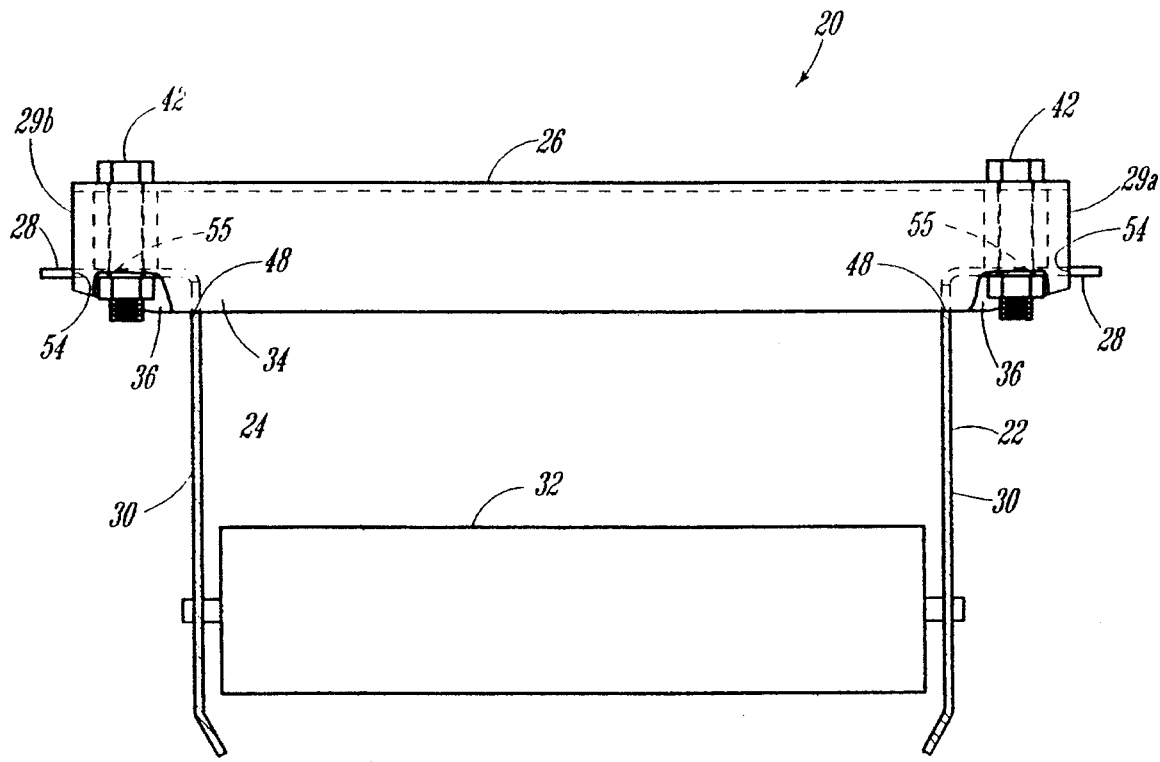
FIG. 4 is a section view taken along line 4—4 of FIG. 2.

Referring to FIGS. 1, 2 and 4, there is shown a portion of a modular frame assembly in accordance with the present invention and generally designated by the numeral 20. The frame assembly 20 comprises spaced apart, elongated, longitudinal beam members 22 and 24 which are interconnected in a unique manner by transverse beam members 26, for example. The beam members 22 and 24, which may be of identical construction, comprise somewhat L-shaped or angle members having generally horizontally extending flanges 28, respectively, and respective depending leg portions 30 adapted to support spaced apart conveyor chains support rollers 32, one shown in FIG. 4. The transverse beam members 26 are characterized as channel members having spaced apart, generally parallel extending flanges 34 and 36 and a connecting web portion 38, respectively. The height of the flanges 34 and 36 may be such that the transverse beam members 26 are held in a partial standoff position from the flanges 28 by suitable spacer members 40, for example. The spacers 40 have a central bore formed therein to permit a conventional threaded bolt and nut assembly 42 to be extended through a suitable bore in the web 38 and a suitable bore formed in the flanges 28 of the beam members 22 and 24 so that the beam members 26 may be tightly secured to the beam members 22 and 24.

The aforedescribed connection between the beam members 26 and the beam members 22 and 24 is enhanced by a unique connection between the beam members 26 and the beam members 22 and 24 which assist in locating the beam members 22 and 24 more accurately relative to each other and to locate the beam members 26 more accurately relative to each other. The unique connection to be described herein also provides a more rigid connection between the transverse beam members 26 and the longitudinal beam members 22 and 24 which is provided in a frame assembly which can be easily assembled and disassembled, at will.

Figure 3:
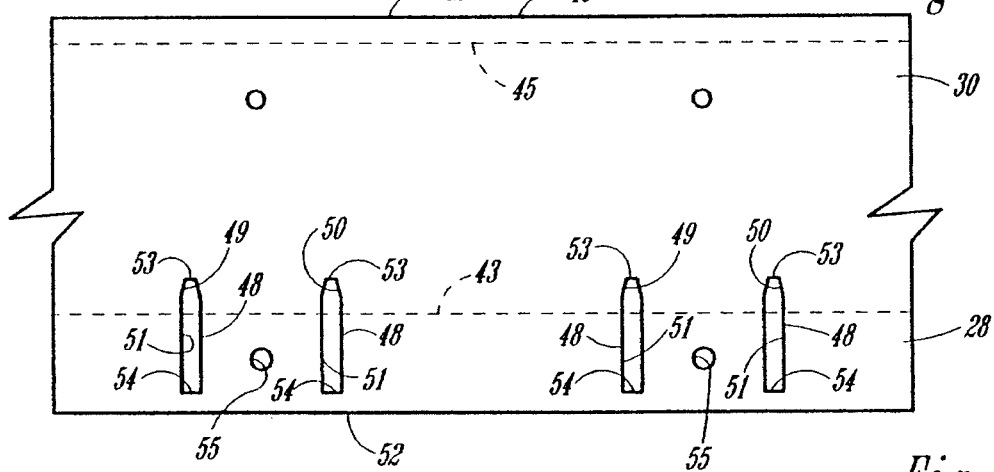
FIG. 3 is a developed plan view of one of the longitudinal frame members or beams of the embodiment of the invention shown in FIGS. 1 and 2.

FIG. 3 illustrates a developed plan view of the beam member 22. The beam member 24 is virtually identical to the beam member 22. The beam member 22 is adapted to be folded or bent along a line 43 to provide the flange 28 and the depending leg 30. The beam member 22 may also be partially folded along a line 45 to provide a longitudinal edge 46 for the beam member 22 which assists in making the depending leg 30 somewhat more rigid. As shown in FIG. 3, the beam member 22 has a plurality of generally parallel elongated slots 48 formed therein which may be provided by one of several manufacturing techniques including punching, laser cutting or other manufacturing processes for slots and openings in metal plate or sheet. The slots 48 are provided in pairs which are spaced apart in such a way that inwardly tapered surfaces 49 and 50 are provided which have a predetermined distance between each other which is slightly less than the distance between the flanges 34 and 36 of the beam members 26. As shown in FIG. 3, the slots extend across the fold line 43 and have an elongated, generally rectangular portion 51 extending toward the distal edge 52 of the flange 28. The slots 48 are also provided with transverse edges 54 opposite the ends of the slots which include the tapered surfaces 49 and 50. Accordingly, the slots 48 intersect the line of intersection 43 of the flange 28 with the leg 30 of the beam member 22, which line of intersection may be a fold line as indicated previously.

When the beam members 22 and 24 have been fabricated so that the respective flanges 28 intersect the leg portions 30 at substantially right angles or a suitable acute angle, the longitudinal beam members may be assembled to the transverse beam members 26 by inserting the flanges 34 and 36 into respective pairs of slots 48 in the longitudinal beam members and securing the beam members 26 to the beam members 22 and 24 by the fastener assemblies 42, as shown, which extend through suitable openings 55 in the beam members 22 and 24, FIG. 4. The beam members 26 have suitable elongated slots 27 formed in the web portions 38 for receiving the fastener assemblies 42. The spacing of the beam members 22 and 24 is assured by locating the opposed transverse ends 29a and 29b of the beam members 26 in registration with the transverse edges 54 of the slots 48. As the fastener assemblies 42 are tightened, the flanges 34 and 36 of the beam members 26 will be elastically deflected inwardly toward each other as they engage the surfaces 49 and 50 of the slots 48. In this way, precise location of the beam members 26 with respect to each other and with respect to the beam members 22 and 24 is provided, the beam members 26 are more rigidly secured to the beam members 22 and 24 and the beam members 26 may be disassembled from the beam members 22 and 24 at any time by disassembling the fastener assemblies 42.

Figures 5, 6:
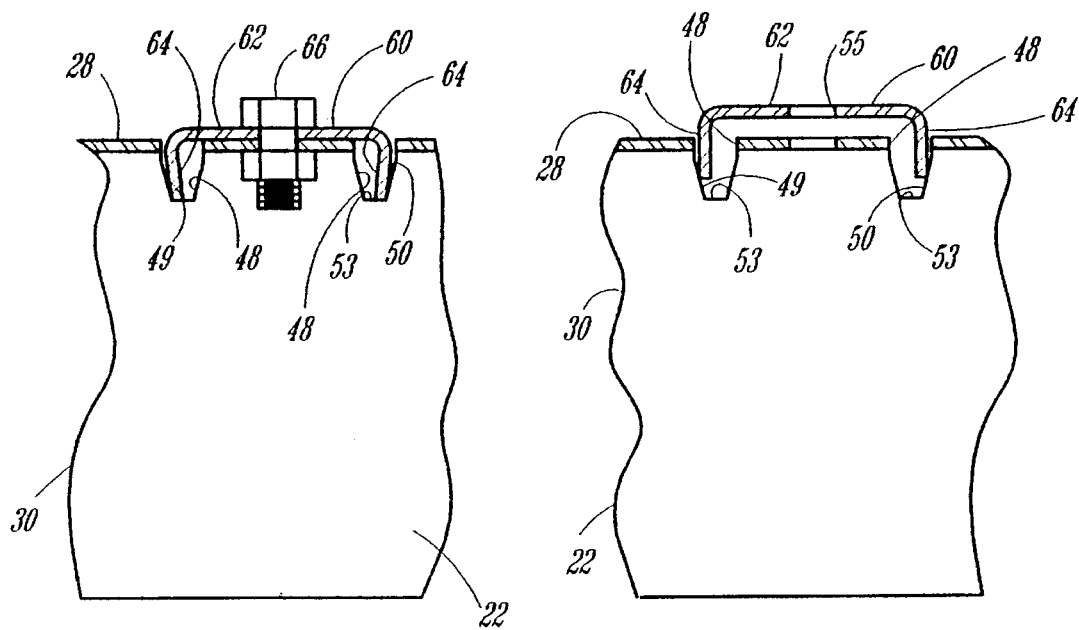
FIG. 5 is a detail section view of an alternate embodiment of the frame assembly showing how the transverse beam members are assembled to the longitudinal beam members.
FIG. 6 is a detail view similar to FIG. 5 showing the beam members secured together by a conventional threaded fastener assembly.

FIGS. 5 and 6 illustrate a modification to a modular frame assembly in accordance with the invention wherein the beam members 22 and 24 are interconnected by transverse beam members 60, one shown in FIGS. 5 and 6, which have a transverse web portion 62 and depending flanges 64 which are shorter than the flanges of the beam members 26. However, the flanges 64 are also spaced apart a distance slightly greater than the distance between the tapered surfaces 49 and 50 of the slots 48 so that when the beam members 60 are assembled to a pair of opposed beam members 22 and 24 and secured thereto by a fastener assembly 66, FIG. 6, the flanges 64 are inwardly deflected toward each other but do not register with transverse edge 53 of the slots 48 before the web 60 engages the flange 28 of the beam members 22 or 24, as shown. However, a modular frame assembly using the transverse beam members 60 enjoys the same advantages as the frame assembly 20.

Referring now to FIGS. 7 through 10, there is shown a modular frame assembly in FIGS. 8 through 10, generally designated by the numeral 70. The frame assembly 70 is made up of a plurality of transverse beam members 60 which interconnect opposed longitudinal beam members 72 which are formed as channel members having opposed flanges 74, FIG. 9, interconnected by a transverse web 76. FIG. 7 shows a developed plan view of one of the beam members 72 and the lines of intersection 77, respectively, between the flanges 74 and the web 76. The beam members 72 may be formed by folding metal plate along the lines of intersection 77 so that the flanges 74 extend at substantially right angles to the web 76. The beam members 72 may be formed in another manner. However, an advantageous manner of fabricating the beam member 72 is to suitably cut a plurality of slots 78 in the pattern shown in FIG. 7 along opposite, longitudinal sides of the beam members 72 and intersecting the fold or intersection lines 77, as indicated. The slots 78 are configured substantially identical to the slots 48 of the embodiments of FIGS. 1 through 3 and having respective tapered surfaces 80 and 82. A third slot is formed adjacent a pair of slots 78 which are adjacent each transverse end 84 and 86 of the beam members 72 so that the beam members may be interconnected with each other, as indicated in FIG. 10 by suitably securing opposed ones of the beam members 60 to the beam members 72 in registration with the slots 78 in the same manner as the embodiments of FIGS. 1 through 6. Accordingly, a modular frame assembly, as shown in FIGS. 8, 9 and 10 may be provided wherein the longitudinal beam members 72 are formed as channels rather than angle or L-shaped members and the frame assembly 70 may be reinforced by securing transverse beam members 60 to the beam members 72 opposed to each other and engaged with both flanges 74 of the beam members 72 in the manner illustrated.

Referring now to FIGS. 11 through 18, another embodiment of a modular frame assembly in accordance with the invention is illustrated and generally designated by the numeral 90. The frame assembly 90 is made up of opposed longitudinal beam members 92 which are interconnected by transverse beam members 94. The beam members 92 have flanges 96 and depending leg portions 98 which intersect each other at a line of intersection 100, see FIGS. 11 and 15. Referring to FIG. 15, one of the beam members 92 is shown in a planar development view wherein the flange 96 and leg 98 are co-planar. The beam member 92 may be fabricated by folding a plate member shown in FIG. 15 along the fold or intersection line 100 to define the flange 96 and the leg 98. Referring further to FIG. 15, the beam members 92 each include spaced apart somewhat L-shaped slots 102 formed therein and having a first leg portion 104 extending parallel to the line of intersection 100 and a second leg portion 106 intersecting the leg 104 and extending generally normal to the line of intersection 100. As shown in FIG. 15, the leg portion 104 of the slots 102 is of a width such that it is essentially bisected by the line of intersection 100. Suitable fastener receiving openings 108 are formed in the flange portion 96 adjacent each of the slot leg portions 104, as illustrated.

Referring now to FIGS. 16, 17 and 18, the beam members 94 are preferably formed as angle or L-shaped members having opposed flanges 110 and 112 which intersect each other at a right angle. The flanges 110 have opposed fastener receiving openings 111 formed therein which are adapted to be aligned with the fastener receiving openings 108 in the beam members 92. The flanges 112 have opposed sloping surfaces 114 defining portions of opposed transverse edges of the beam members 94 and which intersect surfaces 116 extending generally parallel to each other and normal to the plane of the flange 110.

Figure 11:
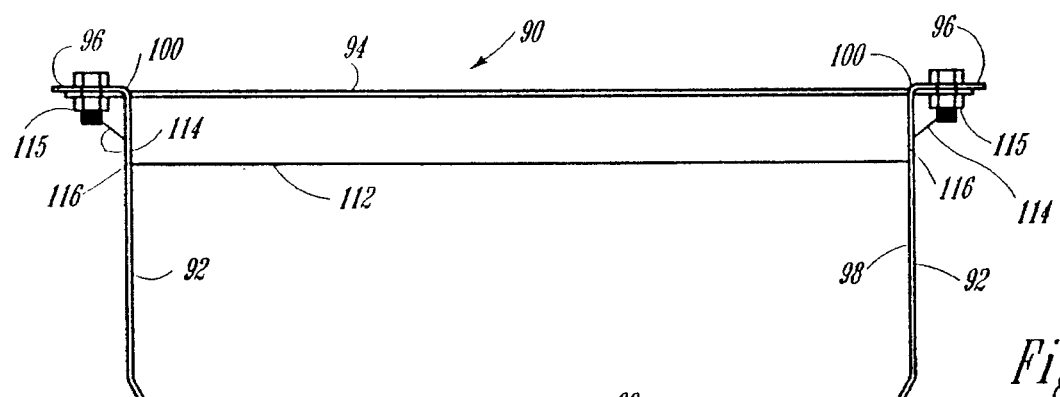
FIG. 11 is a transverse end view of a second alternate embodiment of a frame assembly in accordance with the invention.
Figure 12:
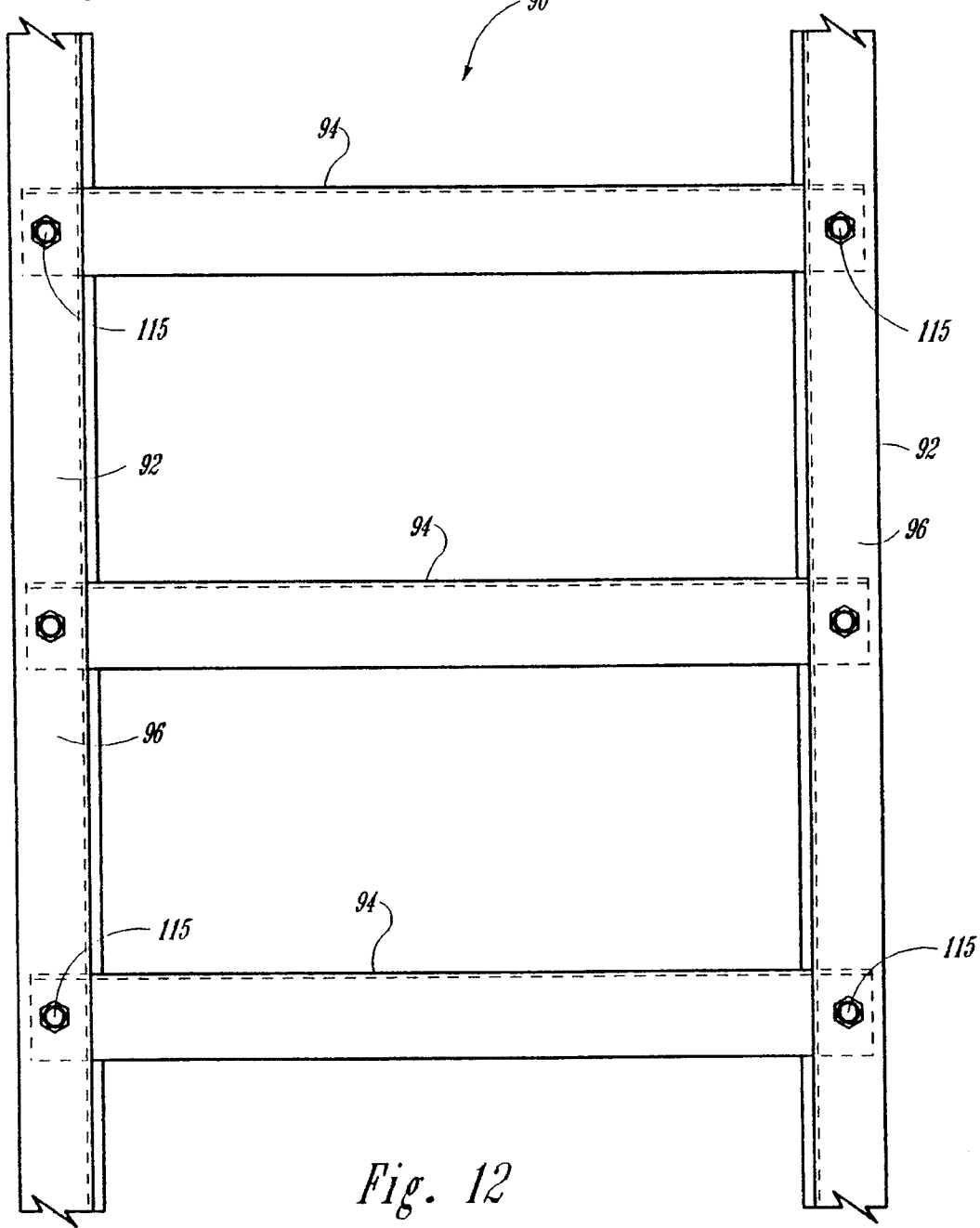
FIG. 12 is a plan view of the frame assembly shown in FIG. 11.

Referring now to FIGS. 11, 12, 13 and 14, the modular frame assembly 90 is assembled by forming the beam members 92 to have the configuration shown in FIGS. 11 and 12 and to insert opposite ends of the beam members 94 into the slots 102 formed in the beam members 92, respectively, until the transverse surfaces 116 engage the depending legs 98 of the beam members 92. The surfaces 116 thus assist in locating the beam members 92 spaced apart relative to each other and also align the fastener receiving openings 111 with the openings 108. As shown in FIG. 14, in particular, the flange 110 of the beam member 94 extends within the slot leg portion 104 while the flange 112 of the beam member 94 extends within the slot leg portion 106. A suitable fastener assembly 116 is extended through the openings 108 and 111 to secure the beam members 94 to the beam members 92. Alternatively, the slot 102 may have a second leg portion 106a, as shown in FIG. 14, extending parallel to the leg portion 106. In like manner the transverse beam member 94 may be formed as a channel having opposed flanges 112 and 112a. FIG. 15 shows the leg portions 106a of the slots 102, which leg portions may be formed as part of the slots 102 at the time they are punched, cut or otherwise fabricated.

The modular frame assembly 90 enjoys many of the benefits of the frame assemblies 20 and 70. For example, the beam members 92 may be fabricated from metal plate, and the slots 102 and openings 108 suitably formed prior to folding the plate members to form the flanges 96 and leg portions 98, respectively. The form of fabrication of the slots 102 and openings 108 may be according to the above-mentioned manufacturing processes. The beam members 94 may also be formed from metal plate folded to provide the flanges 110 and 112 and cut to shape prior to folding to provide the surfaces 114 and 116. Thanks to the provision of the L-shaped slots 102 and the surfaces 114 and 116 on the beam members 94, the beam members 94 may be rigidly secured to the longitudinal beam members 92 at the respective cooperating fastener receiving openings 108 and 111 while the spacing between the beam members 92 is predetermined by the surfaces 116. The modular frame assembly 90 also has the advantage that the beam members 92 and 94 may be substantially co-planar along the plane of the flanges 96 of the beam members 92.

Figure 19:
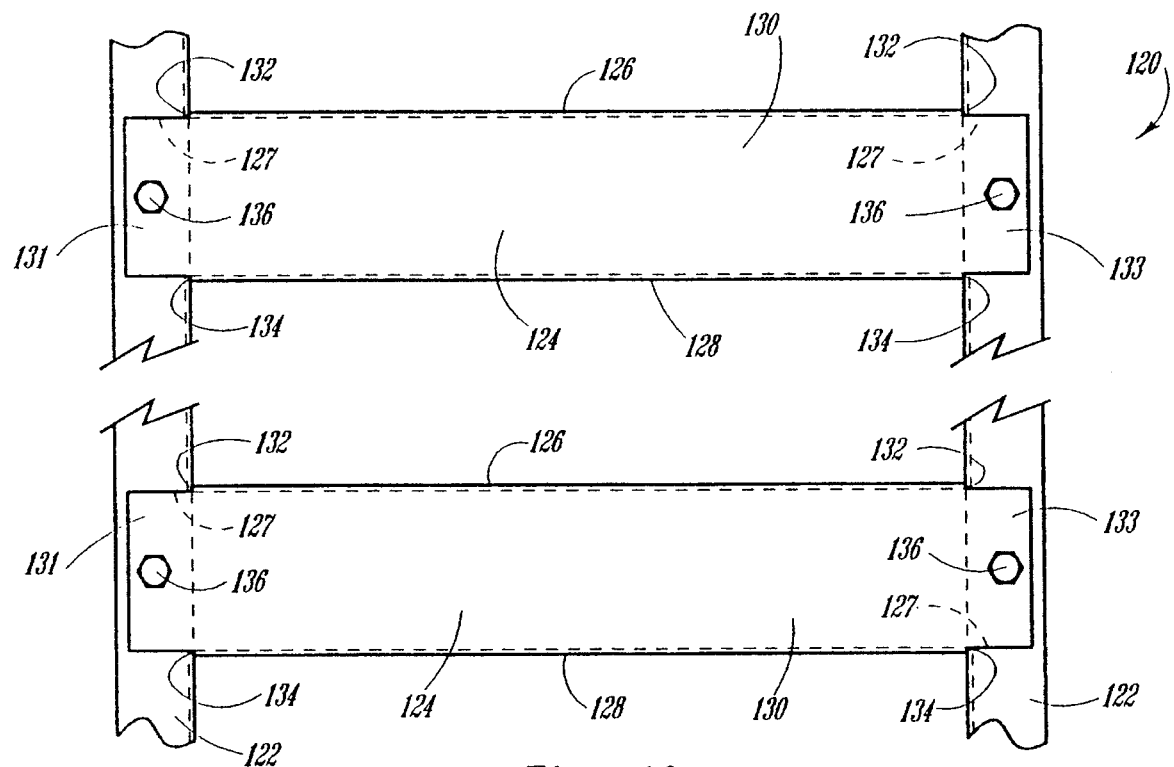
FIG. 19 is a plan view of a portion of a third alternate embodiment of a frame assembly in accordance with the invention.
Figure 20:
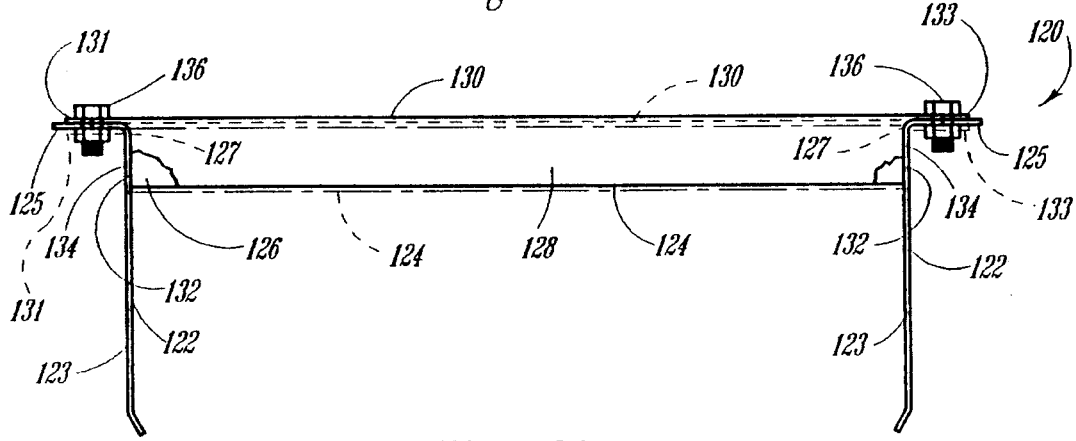
FIG. 20 is an elevation of the frame assembly shown in FIG. 19.

Referring now to FIGS. 19 and 20, another embodiment of a modular frame assembly in accordance with the invention is illustrated and generally designated by the numeral 120. The frame assembly 120 is provided with angle or channel shaped longitudinal beam members 122 and transverse beam members 124. The transverse beam members 124 are preferably formed as channel members having opposed flanges 126 and 128 interconnected by a web portion 130. As illustrated, the flanges 126 and 128 are not coextensive with the web 130 for the entire length of the transverse beam members 124. However, the flanges 126 and 128 provide opposed transverse edges 132 and 134, respectively, which edges extend in planes normal to the web 130. The edges 132 and 134 abut the depending leg portions 123 of the longitudinal beam members 122 and opposed distal ends of the web 130, indicated by numerals 131 and 133 overlie the flanges 125 of the longitudinal beam members 122. Alternatively, the longitudinal beam members 122 may have slots 127 formed therein at spaced apart points which are generally parallel to and adjacent the flanges 125 for receiving the distal end portions 131 and 133 of the transverse beam members 124.

Accordingly, the frame assembly 120 may be assembled by securing the transverse beam members 124 to the longitudinal beam members 122 with the web distal end portions 131 and 133 overlying the flanges 125 or disposed in the slots 127 and lying beneath the flanges 125. In either arrangement, the beam members 124 are secured to the beam members 122 with suitable fastener assemblies 136. A particular advantage of the frame assembly 120 resides in the provision of the transverse edges 132 and 134 which abut the leg portions 123 of the longitudinal beam members and since these transverse edges are spaced apart in the direction of the longitudinal beam members, they provide a rigid interconnection between the transverse beam members and the longitudinal beam members. This rigid interconnection substantially minimizes any tendency for the longitudinal beam members to flex or pivot relative to the transverse beam members and the spacing between the longitudinal beam members is easily set by the spacing between the opposed edges 132 and 134 of the respective flanges 126 and 128 of the beam members 124.

The modular frame assemblies described hereinabove may be fabricated of conventional metal plate, using steel or aluminum, for example. The formation of the slots 48, 78, 102 and 107 may be carried out using conventional manufacturing processes and accurate spacing of the slots in the respective beam members will assure a dimensionally accurate frame assembly when the longitudinal beam members are interconnected by the respective transverse beam members. Alternatively, the beam members 22, 24, 72, 92 and 122 may be prefabricated to be angle or channel cross section type members and the slots may be formed at the intersection of the flanges with the webs or legs of the beam members and having the same configuration as shown and described herein.

Although preferred embodiments of a unique modular frame assembly have been described in detail herein, those skilled in the art will recognize that various substitutions and modifications may be made to the frame assemblies without departing from the scope and spirit of the invention as recited in the appended claims.

What is claimed is:

1. A modular frame assembly, particularly useful for material handling conveyor systems, said frame assembly comprising:
   spaced apart elongated longitudinal beam members, each of said longitudinal beam members having a generally transverse flange portion and intersecting a web or leg portion along a line of intersection;
   a plurality of transverse beam members adapted to be connected to each of the longitudinal beam members to form a ladder-like frame assembly;
   said longitudinal beam members having spaced apart slots extending generally transverse to the direction of said longitudinal beam members;
   said transverse beam members having opposed flanges engageable with said longitudinal beam members at said slots to form a rigid interconnection between said longitudinal beam members and said transverse beam members; and
   means for fastening said transverse beam members to said longitudinal beam members whereby said transverse beam members are forcibly engaged with said longitudinal beam members by registration of said flange portions of said transverse beam members with said longitudinal beam members at said slots.

2. The frame assembly set forth in claim 1 wherein:
   said slots comprise pairs of slots and each slot of a pair has an inwardly sloping surface sloping toward the corresponding surface of an adjacent slot, said surfaces being engageable with said flange portions of said transverse beam member to elastically deflect said flange portions of said transverse beam member to locate said longitudinal beam members with respect to said transverse beam member and to provide a rigid interconnection between said transverse beam member and said longitudinal beam members, respectively.

3. The frame assembly set forth in claim 2 wherein:
   said slots intersect said line of intersection of said longitudinal beam members.

4. The frame assembly set forth in claim 3 wherein:
   said slots include transverse surfaces formed at an end of said slots opposite an end which includes said sloping surfaces, said transverse surfaces being engageable with a transverse end surface of said flange portion of said transverse beam member to position said longitudinal beam members spaced apart from each other a predetermined distance.

5. The modular frame assembly set forth in claim 1 wherein:
   said longitudinal beam members comprise angle members having a transverse flange and a depending leg portion.

6. The frame assembly set forth in claim 1 wherein:
   said longitudinal beam members comprise channel members having opposed flanges and an interconnecting web.

7. The frame assembly set forth in claim 6 wherein:
   said frame assembly includes opposed pairs of transverse beam members engaged with said longitudinal beam members at slots formed in each of said flanges of said longitudinal beam members, respectively.

8. The frame assembly set forth in claim 1 wherein:
   said longitudinal beam members are formed of metal plate folded along a line of intersection to define said flanges and one of said leg portion and said web, respectively.

9. The frame assembly set forth in claim 8 wherein:
   said transverse beam members are formed as channel members having spaced apart flanges that are connected by a web portion.

10. The frame assembly set forth in claim 1 wherein:
    said transverse beam members comprise angle members having opposed flanges intersecting each other.

11. A modular frame assembly comprising:
    a pair of spaced apart longitudinal beam members, each of said beam members including a flange portion and a depending leg portion formed by one of a web and flange and intersecting said flange portion and a plurality of slots formed adjacent a line of intersection of said flange portion with said leg portion; and
    a plurality of transverse beam members, each of said transverse beam members having flange means adapted to be inserted in said slots in said longitudinal beam members; and
    fastening means for securing said transverse beam members to said longitudinal beam members wherein said flange means of each of said transverse beam members is secured to a flange of a longitudinal beam member to provide a substantially rigid interconnection between said transverse beam members and said longitudinal beam members, respectively.

12. The frame assembly set forth in claim 11 wherein:
    said transverse beam members each include opposed flanges and spaced apart surfaces formed in at least one of said flanges and extending substantially normal to the other of said flanges of said transverse beam member, said surfaces being engageable with said longitudinal beam members to determine the spacing between said longitudinal beam members of said frame assembly.

13. The frame assembly set forth in claim 11 wherein:
    said longitudinal beam members are formed of metal plate folded along said line of intersection to provide said flange and said depending leg portion, respectively, and said slots have at least one portion which is at least adjacent to and substantially parallel to said line of intersection.

14. A modular frame assembly comprising:

a first set of spaced apart substantially parallel longitudinal beam members, each of said longitudinal beam members having a flange portion and a depending leg portion intersecting each other along a line of intersection, spaced apart pairs of slots formed in said longitudinal beam members and intersecting said line of intersection;

at least one slot disposed adjacent a transverse end of each of said longitudinal beam sections and intersecting said line of intersection;

plural transverse beam members, each of said transverse beam members including spaced apart flange portions and an interconnecting web portion, said flange portions being extensible into said slots of said pairs of slots to position said longitudinal beam members with respect to each other and with respect to said transverse beam members;

fastening means for securing said transverse beam members to said longitudinal beam members to form respective frame sections of said frame assembly; and at least one transverse beam member having its flanges disposed in said slots adjacent said transverse end of said longitudinal beam members of one frame section and an adjacent frame section to couple said frame sections together.

15. A modular frame assembly, particularly useful for material handling conveyor systems, said frame assembly comprising:

spaced apart elongated longitudinal beam members, each of said longitudinal beam members having a generally transverse flange portion and intersecting one of a web or leg portion along a line of intersection;

a plurality of transverse beam members adapted to be connected to each of the longitudinal beam members to form a frame assembly;

said transverse beam members having opposed flange portions engageable with said longitudinal beam members;

said longitudinal beam members including surfaces engageable with said flange portions of said transverse beam members to elastically deflect said flange portions of said transverse beam members to locate said longitudinal beam members with respect to said transverse beam members and to provide a rigid interconnection between said transverse beam members and said longitudinal beam members, respectively; and means for fastening said transverse beam members to said longitudinal beam members whereby said transverse beam members are forcibly engaged with said longitudinal beam members by registration of said flange portions of said transverse beam members with said surfaces on said longitudinal beam members.

16. The frame assembly set forth in claim 15 wherein:

said surfaces on said longitudinal beam members are defined by spaced apart pairs of slots extending generally transverse to the direction of said longitudinal beam members.

17. The frame assembly set forth in claim 16 wherein:

said slots intersect said line of intersection of said longitudinal beam members.

18. The frame assembly set forth in claim 17 wherein:

said slots each include transverse surfaces formed at an end of said slots opposite an end which includes respective sloping surfaces-engageable with said flange portions of said transverse beam members, said transverse surfaces being engageable with a transverse end surface of said flange portion of said transverse beam member to position said longitudinal beam members spaced apart from each other a predetermined distance.

19. The modular frame assembly set forth in claim 15 wherein:

said longitudinal beam members comprise angle members having a transverse flange and a depending leg portion.

20. The frame assembly set forth in claim 15 wherein:

said longitudinal beam members comprise channel members having opposed flanges and an interconnecting web.

21. The frame assembly set forth in claim 20 wherein:

said frame assembly includes opposed pairs of transverse beam members engaged with said longitudinal beam members at slots formed in each of said flanges of said longitudinal beam members, respectively.

22. The frame assembly set forth in claim 15 wherein:

said longitudinal beam members are formed of metal plate folded along a line of intersection to define said flanges and one of said leg portion and said web, respectively.

23. A modular frame assembly, said frame assembly comprising:

spaced apart, elongated longitudinal beam members, each of said longitudinal beam members having a generally transverse flange portion and intersecting one of a web or leg portion;

at least one transverse beam member adapted to be connected to each of said longitudinal beam members to form a frame assembly; and said transverse beam member having opposed end portions with surfaces, respectively, which are engageable with said flange portions of said longitudinal beam members and engage surfaces on said at least one of said web or leg portions of said longitudinal beam members to form a rigid connection between said transverse beam member and said longitudinal beam members which predetermines the space between said longitudinal beam members and minimizes flexing of said longitudinal beam members with respect to each other and said transverse beam members.

24. The frame assembly set forth in claim 23 wherein:

said transverse beam member includes opposed flange portions having transverse edges which abut said one of said web or leg portion of said longitudinal beam members, respectively, to predetermine the spacing between said longitudinal beam members and to minimize flexing of said longitudinal beam members with respect to each other and said transverse beam members.

25. The frame assembly set forth in claim 24 wherein:

said transverse beam member has opposed distal web portions which extend at least one of above said flange portion and below said flange portion and in engagement with said flange portion of each of said longitudinal beam members, respectively.

26. The frame assembly set forth in claim 25 wherein:

said longitudinal beam members have slots formed in said one of said web or leg portion for receiving said distal web portions of said transverse beam member for positioning said distal web portions adjacent to said flange portions of said longitudinal beam members, respectively.

* * * * *